United States Patent
Dharmaraj

(10) Patent No.: US 10,081,444 B2
(45) Date of Patent: Sep. 25, 2018

(54) ARTIFICIAL GRAVITY SYSTEM WITH ROTATING GRAVITY CHAMBERS THAT EXTEND RADIALLY

(71) Applicant: The Boeing Company, Chicago, IL (US)

(72) Inventor: Raju Dharmaraj, League City, TX (US)

(73) Assignee: The Boeing Company, Chicago, IL (US)

( * ) Notice: Subject to any disclaimer, the term of this patent is extended or adjusted under 35 U.S.C. 154(b) by 275 days.

(21) Appl. No.: 15/183,680

(22) Filed: Jun. 15, 2016

(65) Prior Publication Data

US 2017/0361950 A1    Dec. 21, 2017

(51) Int. Cl.
| | |
|---|---|
| *B64G 1/60* | (2006.01) |
| *B64G 1/46* | (2006.01) |
| *B64G 1/12* | (2006.01) |
| *B64G 1/64* | (2006.01) |

(52) U.S. Cl.
CPC .................. *B64G 1/46* (2013.01); *B64G 1/12* (2013.01); *B64G 1/60* (2013.01); *B64G 1/641* (2013.01)

(58) Field of Classification Search
CPC .. F16D 67/02; B64G 1/12; B64G 1/46; B64G 1/60
See application file for complete search history.

(56) References Cited

U.S. PATENT DOCUMENTS

| | | | | |
|---|---|---|---|---|
| 3,744,739 A * | 7/1973 | Weaver | ..................... | B64G 1/12 244/172.4 |
| 4,643,375 A * | 2/1987 | Allen | ........................ | B64G 1/60 244/171.9 |
| 5,791,600 A * | 8/1998 | Thompson | ............... | B64G 1/12 244/120 |
| 6,206,328 B1 * | 3/2001 | Taylor | ....................... | B64G 1/12 244/159.6 |
| 6,216,984 B1 * | 4/2001 | Brinsmade | ............... | B64G 1/12 244/159.4 |
| 6,523,782 B2 * | 2/2003 | Barutt | ....................... | B64G 1/12 244/171.9 |
| 9,090,361 B2 * | 7/2015 | Clay | ......................... | B64G 1/14 |
| 9,359,091 B2 * | 6/2016 | Biddlecom | ............... | B64G 1/46 |
| 9,776,743 B2 * | 10/2017 | Dharmaraj | ............... | B64G 1/46 |

(Continued)

*Primary Examiner* — Philip J Bonzell
*Assistant Examiner* — Michael B Kreiner
(74) *Attorney, Agent, or Firm* — Duft Bornsen & Fettig LLP

(57) ABSTRACT

A habitation module that provides an artificial gravity environment. In one embodiment, the habitation module includes a stationary structure including a hub having a plurality of portals spaced radially around an outer cylindrical surface of the hub, and a rotating structure that attaches to the outer cylindrical surface of the hub using rotatable attachment members to rotate about an axis in relation to the hub. The rotating structure includes a platform that attaches to the rotatable attachment members and is configured to revolve around the outer cylindrical surface of the hub on the rotatable attachment members. The rotating structure also includes a gravity chamber that attaches to the platform, and projects radially from the axis. A drive mechanism is configured to rotate the rotating structure about the axis in relation to the hub to simulate a gravitational force within the gravity chamber.

31 Claims, 13 Drawing Sheets

(56) References Cited

U.S. PATENT DOCUMENTS

| | | | |
|---|---|---|---|
| 2014/0068858 A1* | 3/2014 | Wambeke | A47G 9/062 |
| | | | 5/420 |
| 2014/0124627 A1* | 5/2014 | Clay | B64G 1/14 |
| | | | 244/159.3 |
| 2017/0197734 A1* | 7/2017 | Dharmaraj | B64G 1/12 |
| 2017/0197735 A1* | 7/2017 | Dharmaraj | B64G 1/46 |
| 2017/0197736 A1* | 7/2017 | Dharmaraj | B64G 1/60 |
| 2017/0197738 A1* | 7/2017 | Dharmaraj | B64G 1/60 |
| 2017/0240302 A1* | 8/2017 | Dharmaraj | B64G 1/60 |
| 2017/0240303 A1* | 8/2017 | Dharmaraj | B64G 1/60 |

* cited by examiner

ARTIFICIAL GRAVITY SYSTEM WITH ROTATING GRAVITY CHAMBERS THAT EXTEND RADIALLY

FIELD

This disclosure relates to the field of habitation modules that provide artificial gravity environments.

BACKGROUND

When humans occupy a space station, they encounter a zero-gravity environment or "weightless" environment. Extended exposure to a zero-gravity environment can be detrimental to the health of the human occupants, such as muscle and bone degeneration. To avoid these long-term health effects, artificial gravity environments may be installed in the space station. One way to create artificial gravity is with centrifugal force, where a vessel rotates at a speed that drives a human occupant inside of the vessel toward the outer hull of the vessel. The force on the human occupant feels like a gravitational pull.

Because of the health benefits and comfort of artificial gravity, it is desirable to design improved artificial gravity environments for space habitats/vehicles.

SUMMARY

Embodiments described herein include a habitation module for a space station or the like that includes one or more gravity chambers. The habitation module includes a stationary structure, and a rotating structure that rotates in relation to the stationary structure about an axis. The rotating structure includes gravity chambers that extend radially from the axis. The gravity chambers are driven to rotate about the axis to create artificial gravity within the gravity chambers. As an artificial gravity environment is created in the gravity chambers, crew members may enter the gravity chambers for exercise, rest, lounging, or other activities.

One embodiment comprises a habitation module that includes a stationary structure including a hub that comprises a hollow cylinder having a plurality of portals spaced radially around an outer cylindrical surface of the hub. The habitation module further includes a rotating structure that attaches to the outer cylindrical surface of the hub using rotatable attachment members to rotate about an axis in relation to the hub. The rotating structure includes one or more platforms that attach to the rotatable attachment members and are configured to revolve around the outer cylindrical surface of the hub on the rotatable attachment members. The platform(s) includes a first opening that aligns with a portal of the hub. The rotating structure further includes one or more gravity chambers that attach to the platform(s) over the first opening, and project radially from the axis. The habitation module further includes a first drive mechanism configured to rotate the rotating structure about the axis in relation to the hub to simulate a gravitational force within the gravity chamber(s).

In another embodiment, the rotating structure further includes an extendible connector configured to attach the gravity chamber to the platform. The portals each include a first berthing mechanism, and the gravity chamber includes a second berthing mechanism. The extendible connector is configured to contract to allow the second berthing mechanism to connect with the first berthing mechanism to form pressure tight seal, and to extend to provide clearance between the second berthing mechanism and the first berthing mechanism when disconnected for rotation of the rotating structure about the axis.

In another embodiment, the berthing mechanisms comprise Common Berthing Mechanisms (CBM).

In another embodiment, the extendible connector includes a base plate configured to directly attach to the platform, and includes a second opening that aligns with the first opening of the platform. The extendible connector includes a coupling mechanism that directly attaches to the gravity chamber. The extendible connector includes one or more linear actuators that connect between the base plate and the coupling mechanism, and are configured to extend and contract to vary a distance between the base plate and the coupling mechanism.

In another embodiment, the linear actuator comprises a ball screw.

In another embodiment, the gravity chamber includes a hollow cylindrical enclosure that includes an outer wall, an inner wall, and a cylindrical side wall that connects the outer wall and the inner wall. The gravity chamber includes a passage tube that projects from the inner wall of the hollow cylindrical enclosure. The diameter of the hollow cylindrical enclosure is greater than the diameter of the passage tube.

In another embodiment, the coupling mechanism comprises an annular member that fits over the passage tube of the gravity chamber, and attaches directly to the passage tube. The extendible connector includes a flexible tube that extends between the base plate and the annular member to cover a space between the gravity chamber and the platform when the linear actuator is extended.

In another embodiment, the passage tube includes a first hatch, the portals each include a second hatch, and the first hatch and the second hatch are configured to be sealed when the first berthing mechanism and the second berthing mechanism are disconnected, and when the linear actuator extends to provide clearance between the first berthing mechanism and the second berthing mechanism to allow the rotating structure to rotate about the axis.

In another embodiment, the rotatable attachment members include a pair of annular support bearings that attach to the outer cylindrical surface of the hub, and are spaced apart from one another on opposing sides of the portals.

In another embodiment, the platform(s) comprises a curved sheet of material that spans a gap between the pair of annular support bearings.

In another embodiment, the habitation module further includes a counter-rotating member that rotates about the axis in an opposite direction than the rotating structure.

In another embodiment, the counter-rotating member comprises a cylindrical counter-weight, and a second drive mechanism that rotates the cylindrical counter-weight about the axis in the opposite direction than the rotating structure.

In another embodiment, the second drive mechanism adjusts a rotational speed of the cylindrical counter-weight to compensate for a change in mass within the gravity chamber.

In another embodiment, the gravity chamber includes a base plate configured to directly attach to the at least one platform. The gravity chamber includes a cylindrical rigid module that comprises an outer wall of the gravity chamber. The gravity chamber includes one or more linear actuators that connect between the base plate and the cylindrical rigid module, and is configured to extend and contract to vary a distance between the base plate and the cylindrical rigid module. The gravity chamber includes a flexible tube that extends between the cylindrical rigid module and the base plate to cover a space between the cylindrical rigid module and the base plate when the linear actuator(s) is extended.

Another embodiment comprises a habitation module for providing an artificial gravity environment in space. The habitation module includes a stationary structure including a hub that comprises a hollow cylinder having a plurality of portals spaced radially around an outer cylindrical surface of the hub. The habitation module further includes a rotating structure that attaches to the outer cylindrical surface of the hub using annular support bearings to rotate about an axis in relation to the hub. The rotating structure includes an opposing pair of platforms that attach to the annular support bearings and are configured to revolve around the outer cylindrical surface of the hub on the annular support bearings, where the platforms each include a first opening that aligns with a portal of the hub. The rotating structure further includes an opposing pair of gravity chambers that attach to the platforms over the first opening, and project radially from the axis in opposite directions. The habitation module further includes a drive mechanism configured to rotate the rotating structure about the axis in relation to the hub to simulate a gravitational force within the gravity chambers.

Another embodiment comprises a habitation module for providing an artificial gravity environment in space. The habitation module includes a stationary structure including a hub that comprises a hollow cylinder having a plurality of portals spaced radially around an outer cylindrical surface of the hub, where each of the portals includes a first berthing mechanism. The habitation module further includes a rotating structure that attaches to the outer cylindrical surface of the hub using annular support bearings to rotate about an axis in relation to the hub. The rotating structure includes an opposing pair of platforms that attach to the annular support bearings and are configured to revolve around the outer cylindrical surface of the hub on the annular support bearings, where the platforms each include a first opening that aligns with a portal of the hub. The rotating structure further includes an opposing pair of gravity chambers that attach to the platforms over the first opening, and project radially from the axis in opposite directions, where each of the gravity chambers include a second berthing mechanism. The rotating structure further includes extendible connectors configured to attach the gravity chambers to the platforms, where each of the extendible connectors are configured to contract to allow the second berthing mechanism to connect with the first berthing mechanism to form pressure tight seal, and to extend to provide clearance between the second berthing mechanism and the first berthing mechanism when disconnected for rotation of the rotating structure about the axis. The habitation module further includes a drive mechanism configured to rotate the rotating structure about the axis in relation to the hub to simulate a gravitational force within the gravity chambers.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
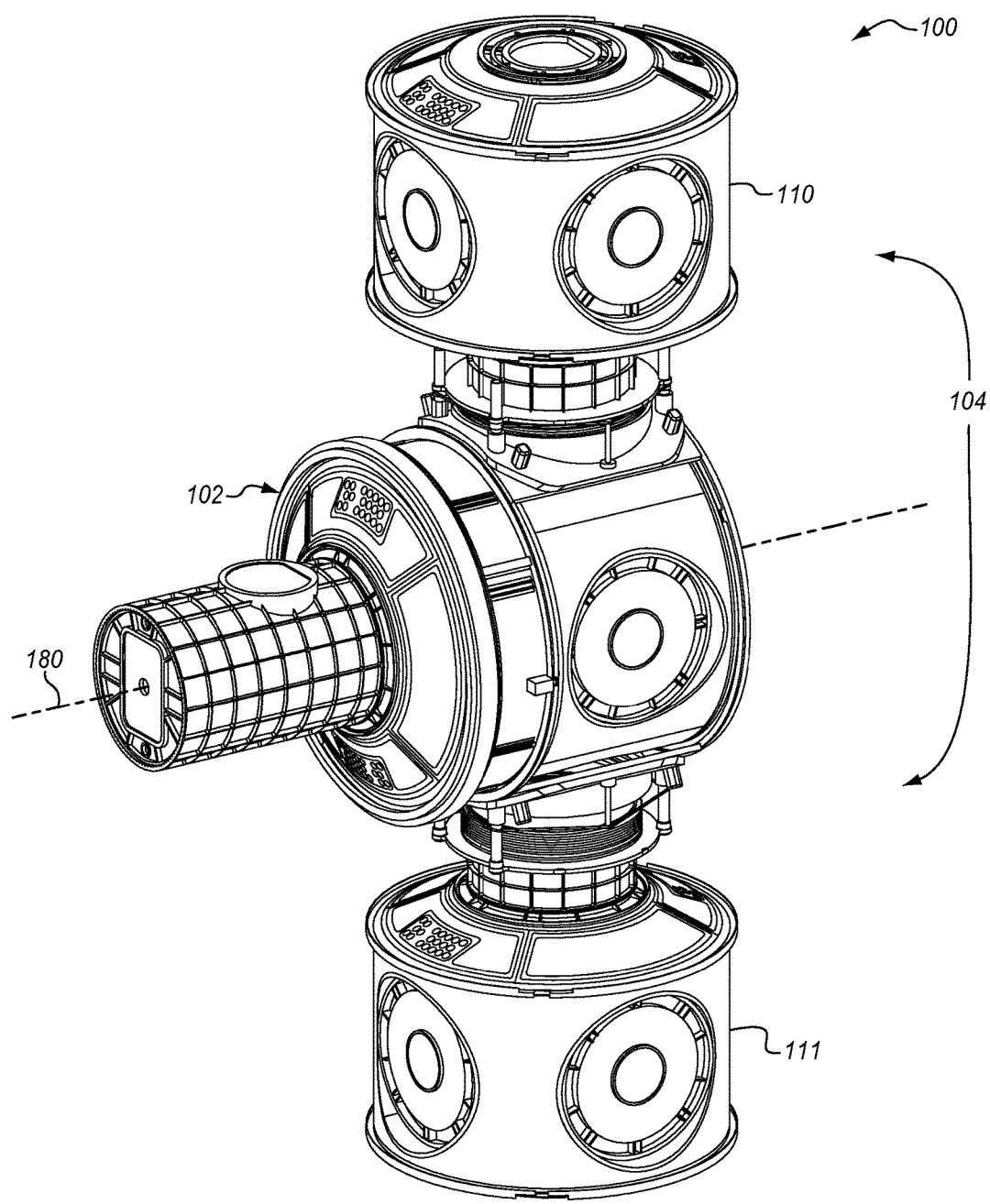
FIG. 1 illustrates a habitation module in an exemplary embodiment.

FIG. 1 illustrates a habitation module 100 in an exemplary embodiment. Habitation module (HAB) 100 is a module used for living quarters for crew members of a space station, such as the International Space Station. For example, HAB 100 may be used for sleeping quarters, restroom facilities, medical facilities, exercise facilities, etc. HAB 100 is configured for space vehicles in Low-Earth Orbit (LEO) or Beyond Low-Earth Orbit (BLEO).

HAB 100 includes a stationary structure 102 and a rotating structure 104 configured to rotate in relation to stationary structure 102 about an axis 180. Rotating structure 104, as described in more detail below, includes one or more gravity chambers 110-111. Gravity chambers 110-111 comprise the pods or compartments of HAB 100 where crew members may experience artificial gravity. Crew members are able to enter the interiors of gravity chambers 110-111. With crew members inside, gravity chambers 110-111 are driven to rotate at a speed about axis 180 to create an artificial gravity environment within gravity chambers 110-111. For example, gravity chambers 110-111 may be driven at 5 rpm, 10 rpm, 12 rpm, etc., to generate a simulated gravity, such as in the range of 0.2 G to 1 G. The speed of rotation is adjustable depending on the comfort of the crew members and the desired artificial gravity inside of gravity chambers 110-111.

Figure 2:
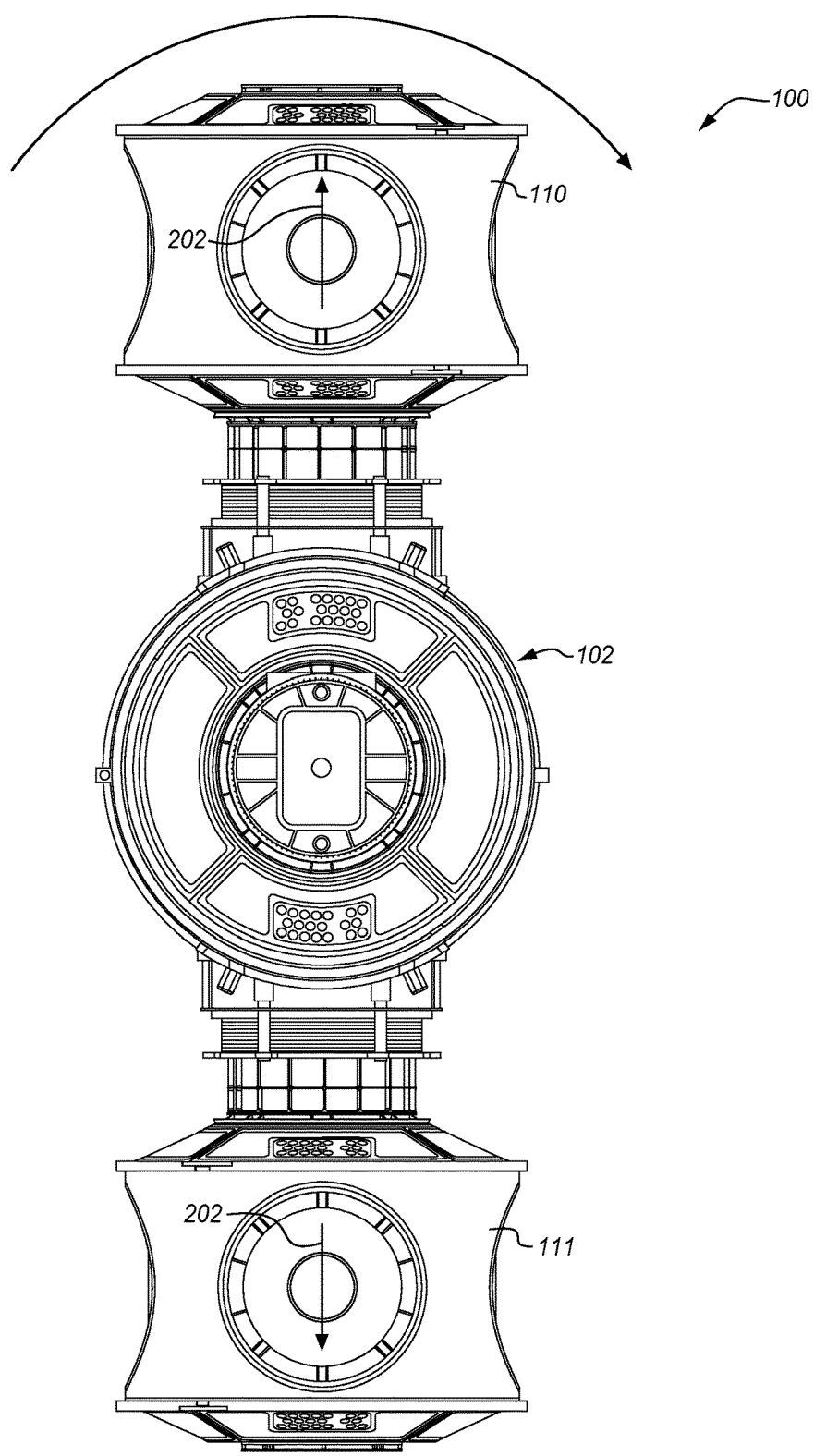
FIG. 2 is a side view of a habitation module in an exemplary embodiment.

FIG. 2 is a side view of HAB 100 in an exemplary embodiment. For the view in FIG. 2, axis 180 from FIG. 1 is into and out of the page. In the embodiments described below, gravity chambers 110-111 are driven to spin in relation to stationary structure 102 about axis 180 (see also FIG. 1) like spokes on wheel. The rotation about axis 180 creates a centrifugal force 202 on objects (e.g., crew members) inside of gravity chambers 110-111. The centrifugal force 202 feels like gravity to crew members inside of gravity chambers 110-111. Although two gravity chambers 110-111 are illustrated in FIGS. 1-2, HAB 100 may be equipped with more or less gravity chambers 110-111 as desired. To balance rotation of gravity chambers 110-111 about axis 180, it may be desirable to install the gravity chambers 110-111 in opposing pairs about the axis 180. An opposing pair of gravity chambers will extend radially from stationary structure 102 in opposite directions (i.e., about 180° apart). The opposing pairs of gravity chambers may have similar size and weight to assist in balancing rotation.

Figure 3:
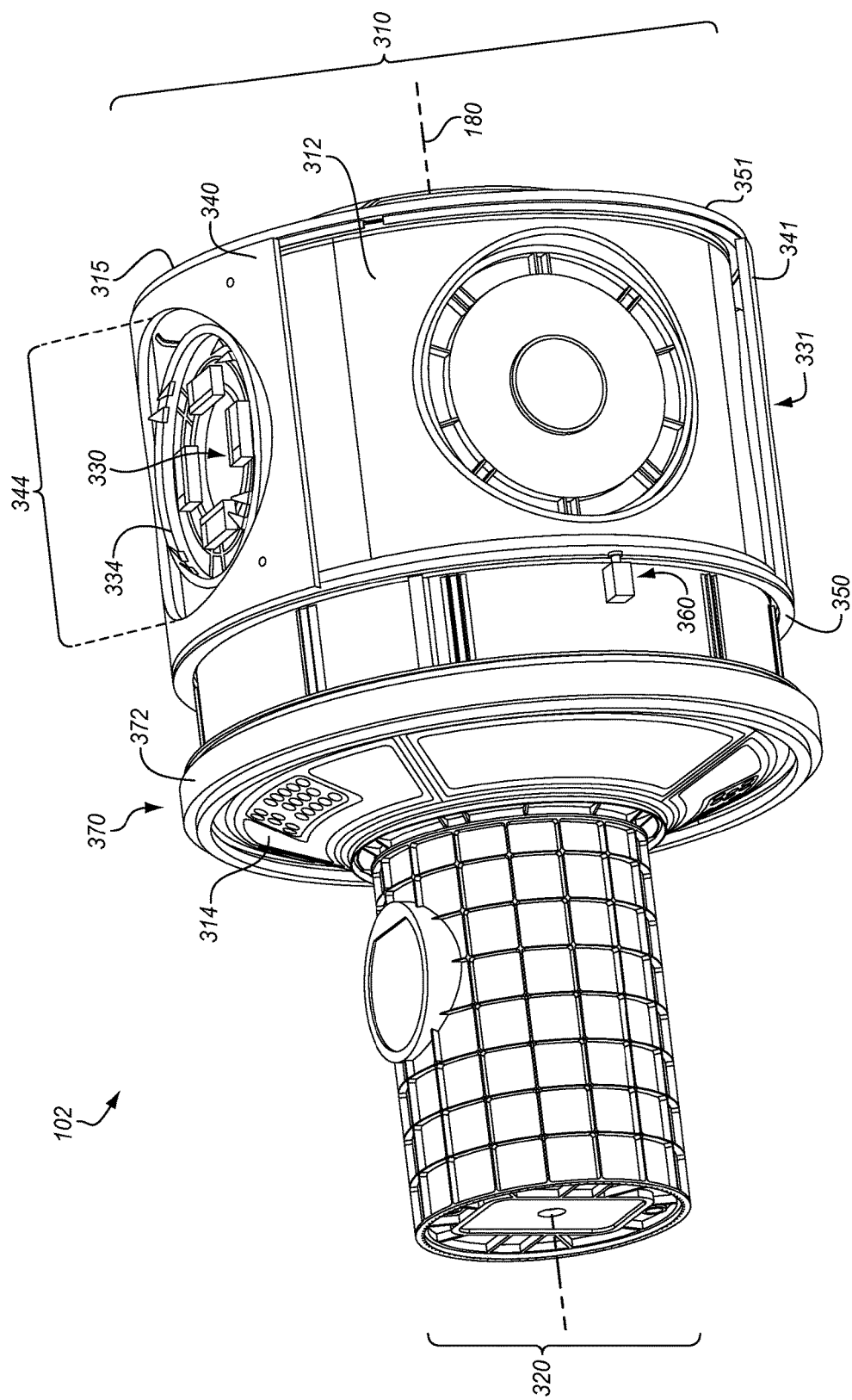
FIGS. 3-4 illustrate a stationary structure of a habitation module in an exemplary embodiment.
Figure 4:
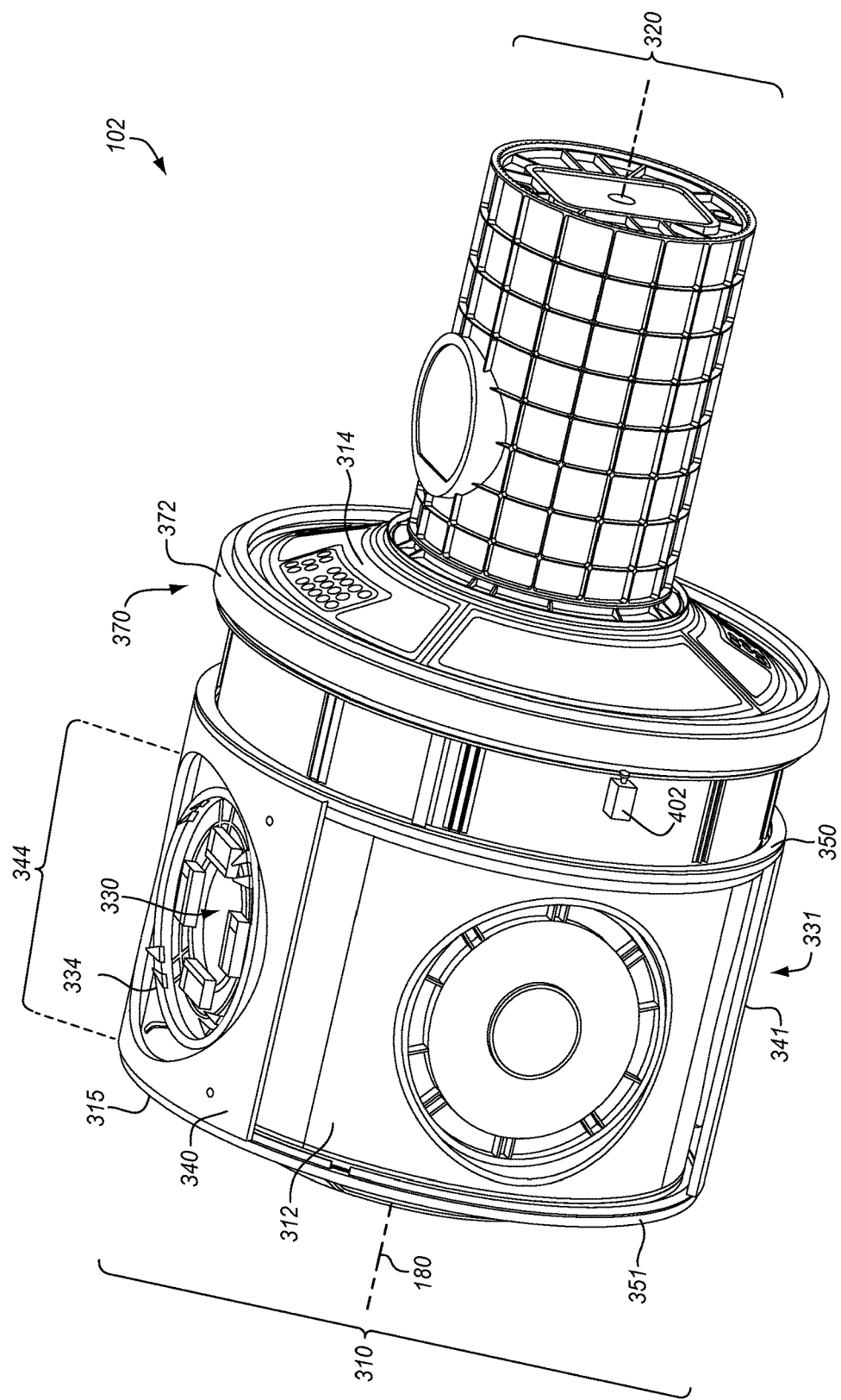

FIGS. 3-4 illustrate stationary structure 102 in an exemplary embodiment. Stationary structure 102 includes a hub 310, which is a cylindrical structure that is substantially hollow in its interior. Hub 310 is comprised of a cylindrical wall 312 and opposing end walls 314-315. End wall 314 has a circular shape and attaches to one end of cylindrical wall 312. End wall 314 also has an opening for attachment to a connecting chamber 320. End wall 315 has a circular shape and attaches to the other end of cylindrical wall 312.

Connecting chamber 320 is a cylindrical structure that is substantially hollow in its interior, and attaches to end wall 314 of hub 310. Connecting chamber 320 may be used to connect stationary structure 102 to other modules of a space station. Hub 310 and connecting chamber 320 may be pressurized and supplied with oxygen for use by crew members, and crew members may pass between hub 310 and connecting chamber 320.

Hub 310 has an outer cylindrical surface that defines the outer diameter of hub 310. Hub 310 also includes a plurality of portals 330-331 that are spaced radially around the circumference of hub 310. Portals 330-331 are openings in hub 310 that provide passageways between the interior of hub 310 and the interiors of gravity chambers 110-111 (see FIG. 1). Each portal 330-331 is able to connect with a gravity chamber 110-111 (see FIG. 1) through a berthing mechanism 334. Berthing mechanism 334 comprises any mechanism that forms an air-tight or pressure-tight seal between hub 310 and a gravity chamber 110-111. One example of berthing mechanism 334 is a Common Berthing Mechanism (CBM). A CBM includes an Active Common Berthing Mechanism (ACBM) and a Passive Common Berthing Mechanism (PCBM) that form a pressure-tight seal. In this embodiment, the berthing mechanism 334 of hub 310 may comprise an ACBM, and a berthing mechanism of a gravity chamber 110-111 may comprise a PCBM.

In the embodiments described herein, gravity chambers 110-111 are driven to rotate in relation to hub 310 about axis 180. To facilitate rotation of gravity chambers 110-111, rotating structure 104 includes one or more platforms 340-341 that are attached to the outer cylindrical surface of hub 310 by rotatable attachment members, such as support bearings 350-351. Support bearings 350-351 are annular or ring-shaped, and attach to the outer cylindrical surface of hub 310. Support bearings 350-351 are spaced apart from one another on either side of portals 330-331. Platforms 340-341 are structures that span a gap between support bearings 350-351. Platforms 340-341 are the structure upon which gravity chambers 110-111 are attached so that gravity chambers 110-111 can be driven to rotate about axis 180. It may be desirable to install the platforms 340-341 in opposing pairs (i.e., about 180° apart) on support bearings 350-351. When platforms 340-341 are attached to support bearings 350-351 in opposing pairs as in FIGS. 3-4, platforms 340-341 may be driven to revolve around the outer cylindrical surface of hub 310. A drive mechanism 360 is configured to mesh with a gear of support bearing 350 to impart rotation onto platforms 340-341. Drive mechanism 360 may comprise an electric motor, a hydraulic motor, a pneumatic motor, or any other actuating device that has a variable rotational speed.

Figure 5:
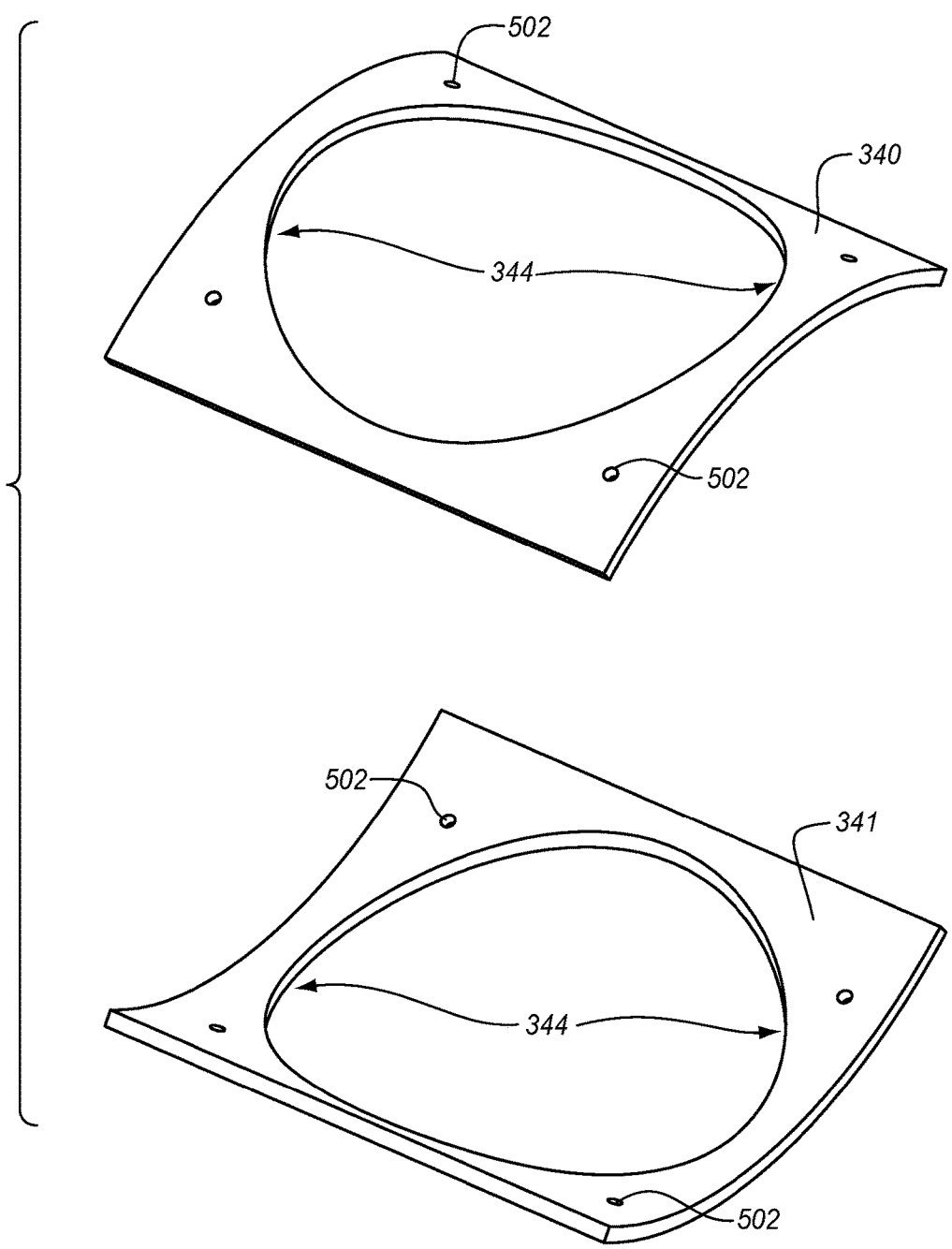
FIG. 5 illustrates platforms of a habitation module in an exemplary embodiment.

FIG. 5 illustrates platforms 340-341 in an exemplary embodiment. Platforms 340-341 comprise any structure that is able to revolve around the outer cylindrical surface of hub 310, and provide a connection point for a gravity chamber 110-111. In this embodiment, platforms 340-341 are curved sheets of material (e.g., metal) that resemble segments of a cylinder. Platforms 340-341 may have a similar curvature as the outer cylindrical surface of hub 310 so that platforms 340-341 may revolve around hub 310. Each platform 340-341 includes an opening 344 that is at least as large as portals 330-331 of hub 310, and is configured to align with a portal 330-331 of hub 310. Each platform 340-341 also includes a plurality of attachment holes 502 for connecting to gravity chambers 110-111. The structure of platforms 340-341 is just one embodiment, and the structures may vary as desired. For example, a single cylindrical platform may be used that slides over hub 310 (see FIG. 3), and attaches to support bearings 350-351.

Figure 6:
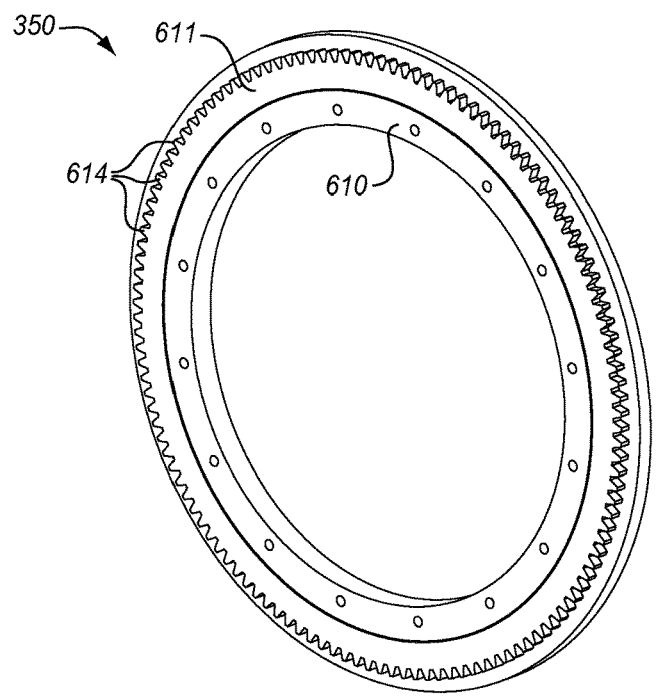
FIGS. 6-7 illustrate support bearings of a habitation module in an exemplary embodiment.
Figure 7:
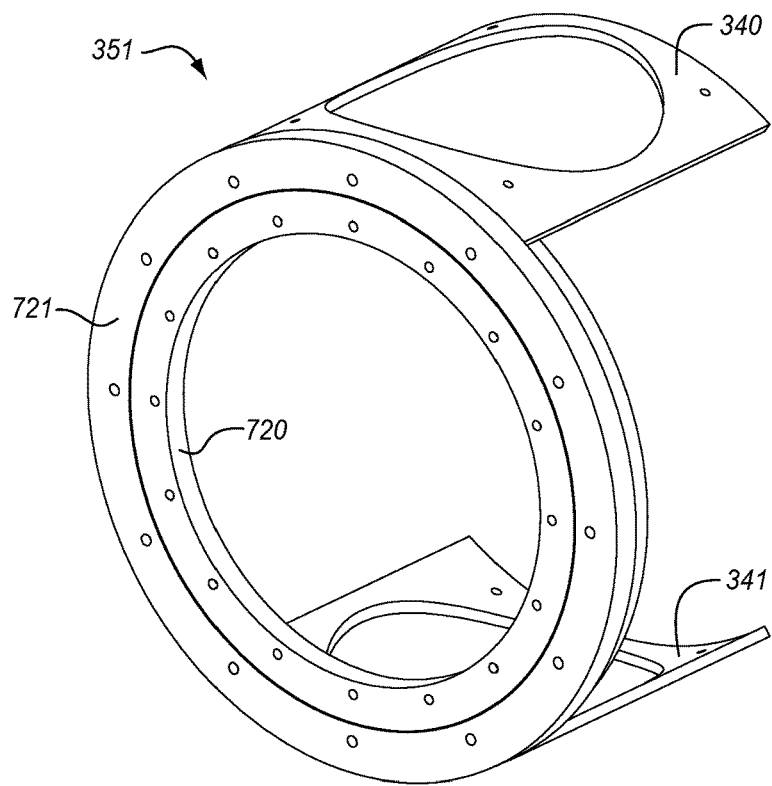

FIGS. 6-7 illustrate support bearings 350-351 in an exemplary embodiment. In FIG. 6, support bearing 350 includes an inner race (or ring) 610, an outer race (or ring) 611, and a rolling element between inner race 610 and outer race 611 that enables rotational movement (not visible in FIG. 6). The rolling element may comprise ball bearings, cylindrical rollers, or the like. Outer race 611 is configured to attach to platforms 340-341, while inner race 610 is configured to attach to the outer cylindrical surface of hub 310 (see FIGS. 3-4). Support bearing 350 also includes a plurality of teeth 614 on outer race 611 for meshing with a drive gear of drive mechanism 360. Support bearing 351 in FIG. 7 has a similar structure as support bearing 350 with an inner race 720 and an outer race 721, except that its outer race 721 does not include teeth. Outer race 721 is configured to attach to platforms 340-341, while inner race 720 is configured to attach to the outer cylindrical surface of hub 310 (see FIGS. 3-4). Although bearings are used in this embodiment, other mechanism may be used that provide a rotating attachment point between platforms 340-341 and hub 310.

Figure 8:
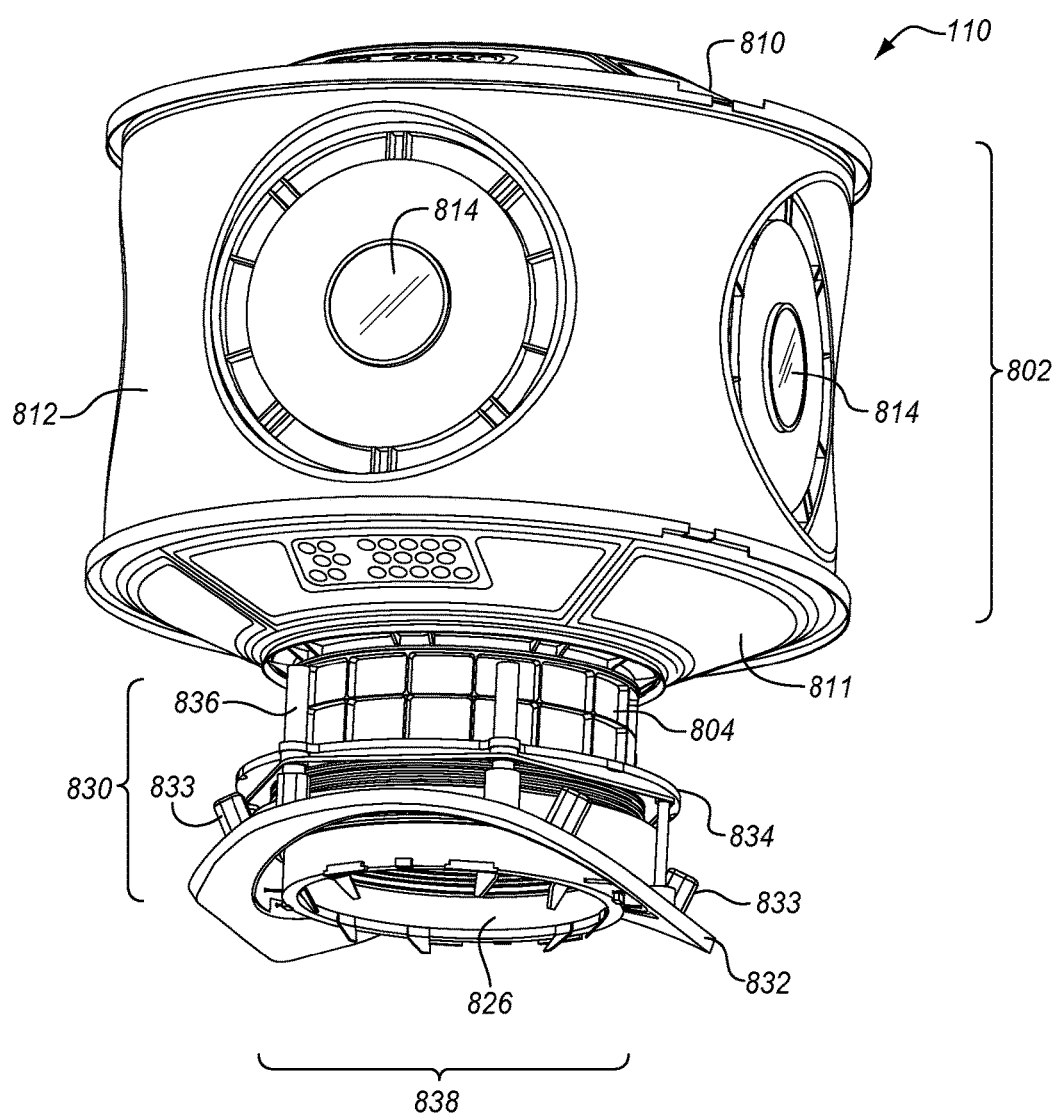
FIGS. 8-9 illustrate a gravity chamber of a habitation module in an exemplary embodiment.
Figure 9:
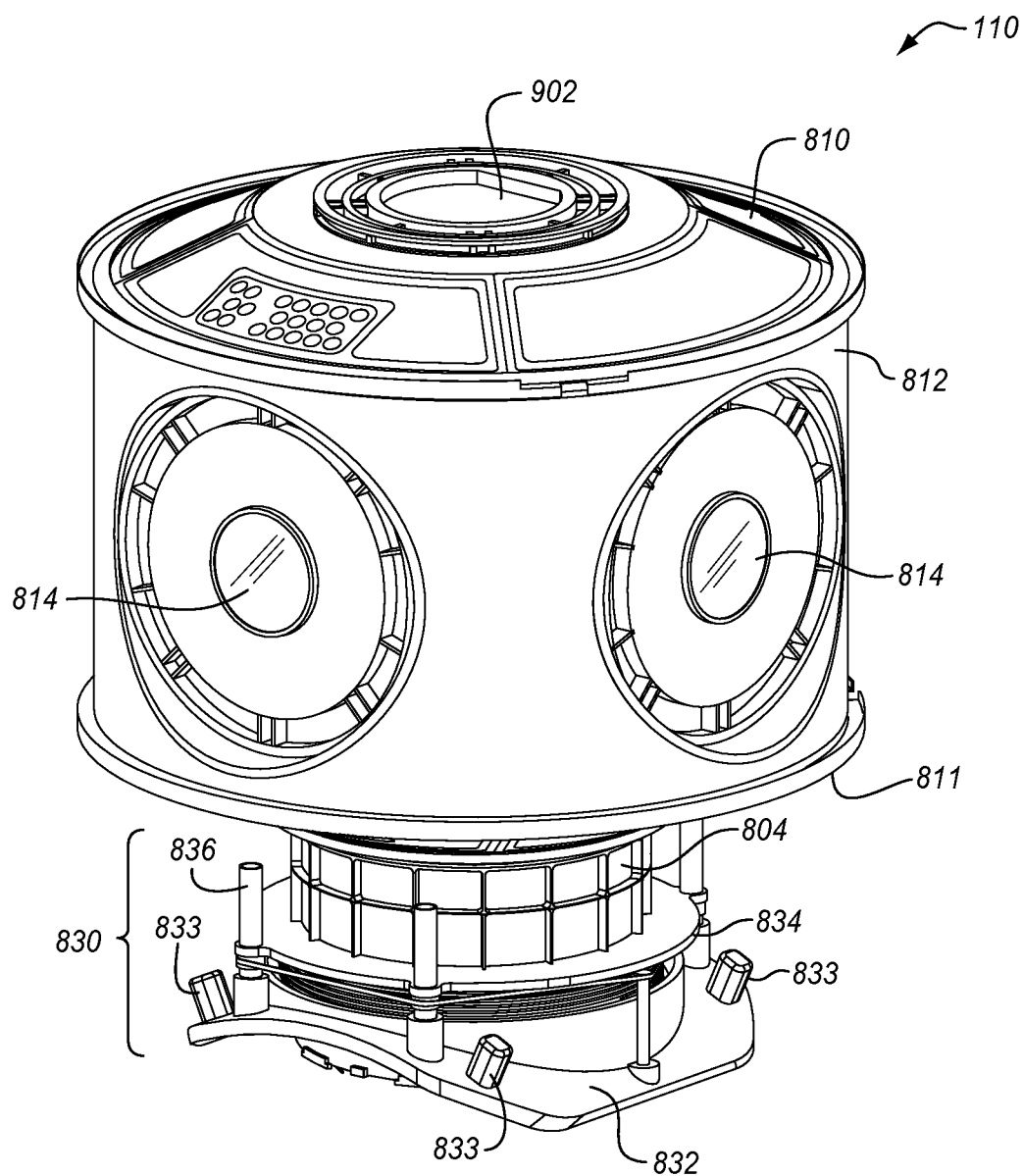

FIGS. 8-9 illustrate gravity chamber 110 in an exemplary embodiment. In this embodiment, gravity chamber 110 is cylindrical and may have a diameter that is about 4.3 meters or less. The diameter of gravity chamber 110 may be limited by the size of the launch vehicle used to transport the individual components of HAB 100 into space. For example, an Atlas rocket from NASA may be used to transport the individual components of HAB 100 into space, and the diameter of gravity chamber 110 may be constrained by the size of the Atlas rocket, which is typically about 4.3 meters. Although gravity chamber 110 has a cylindrical shape in FIGS. 3-4, the shape of gravity chamber 110 may have different shapes in other embodiments.

The interior of gravity chamber 110 may be hollow or empty to form open quarters for crew members. The interior of gravity chamber 110 may include a treadmill, an exercise bike, or any other exercise equipment. The interior of gravity chamber 110 may include restroom facilities (e.g., a shower, a toilet, a sink, etc.), office facilities (e.g., a desk, chairs, cabinets, etc.), lounge facilities (e.g., chairs, a couch, etc.), sleeping facilities (e.g., a bed), or any other facilities. Gravity chamber 110 may also be compartmentalized into individual rooms.

The structure of gravity chamber 110 includes a hollow cylindrical enclosure 802 and a passage tube 804 that projects from hollow cylindrical enclosure 802. Hollow cylindrical enclosure 802 has an outer wall 810, an inner wall 811, and a cylindrical side wall 812 that extends between outer wall 810 and inner wall 811. Outer wall 810, which will serve as the floor of gravity chamber 110, and side wall 812 may be made from a thin metal, a composite material, a plastic, or another type of rigid material. The interior of outer wall 810 and side wall 812 may be lined with a rubber, padding, or any other material that protects crew members inside of gravity chamber 110. Side wall 812 may also include one or more windows 814, and outer wall 810 may include an emergency hatch 902 (see FIG. 9).

Inner wall 811, which will serve as the ceiling of gravity chamber 110, attaches to passage tube 804. Passage tube 804 is a cylinder that is substantially hollow, and provides a passage way for crew members to pass between gravity chamber 110 and an interior of hub 310. Passage tube 804 may include a ladder, steps, or some type of mechanism to assist crew members in traveling through passage tube 804. Passage tube 804 may also include a hatch (not visible) that may be sealed to maintain a pressurized environment within gravity chamber 110. Passage tube 804 may have a smaller diameter than hollow cylindrical enclosure 802 as shown in FIGS. 8-9.

One end of passage tube 804 includes a berthing mechanism 826. The berthing mechanism 826 on passage tube 804 is configured to mate with a berthing mechanism 334 on a portal 330 of hub 310 (see FIGS. 3-4). When berthing mechanism 826 is connected to a berthing mechanism 334 of a portal 330, an airtight seal is formed between hub 310 and gravity chamber 110. When berthing mechanism 826 is disconnected from a berthing mechanism 334 of a portal 330, the hatch within passage tube 804 is sealed to maintain the pressurized environment within gravity chamber 110. Although not visible in FIGS. 3-4, portal 330 may also include a hatch that may be sealed to maintain a pressurized environment within hub 310. When berthing mechanism 826 is disconnected from a berthing mechanism 334 of a portal 330, the hatch within portal 330 is sealed to maintain the pressurized environment within hub 310.

Figure 10:
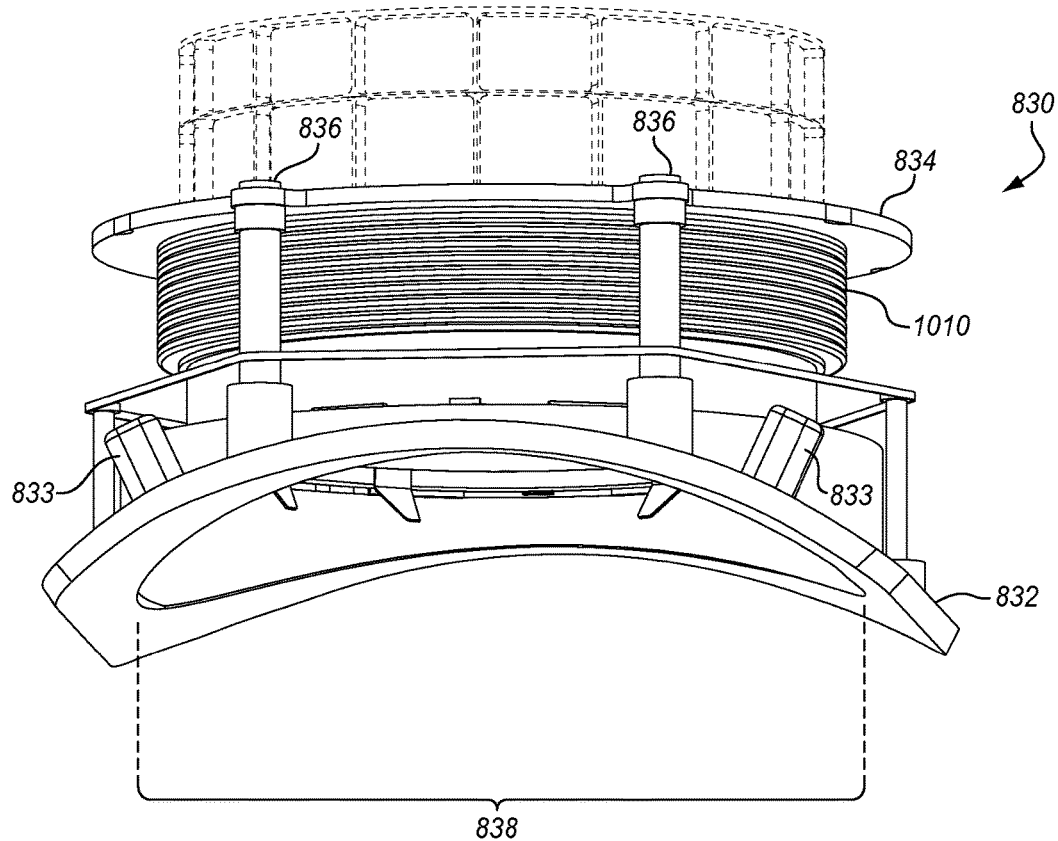
FIG. 10 illustrates an extendible connector of a habitation module in an exemplary embodiment.

FIGS. 8-9 also illustrate an extendible connector 830 for rotating structure 104 that is configured to attach gravity chamber 110 to a platform, such as platform 340 in FIG. 5. Extendible connector 830, as further illustrated in FIG. 10, includes a base plate 832 that directly attaches to platform 340, such as by bolts. For example, base plate 832 may be affixed to platform 340 using power bolts 833 that align with attachment holes 502 (see FIG. 5), and are driven electrically to permanently attach gravity chamber 110 to platform 340. Base plate 832 may be curved to match the shape of platform 340. Extendible connector 830 also includes a coupling mechanism 834 that directly attaches to gravity chamber 110. More particularly, coupling mechanism 834 attaches to passage tube 804 of gravity chamber 110 (see FIG. 8). In one embodiment, coupling mechanism 834 comprises an annular member that fits over passage tube 804, and attaches directly to passage tube 804. Extendible connector 830 also includes one or more linear actuators 836 that connect between base plate 832 and coupling mechanism 834. Linear actuator 836 is configured to extend and contract to vary a distance between base plate 832 and coupling mechanism 834. One example of linear actuator 836 is a ball screw, where a threaded shaft of the ball screw connects to a motor on base plate 832, and a ball nut of the ball screw connects to coupling mechanism 834. Rotation of the threaded shaft applies linear motion to the ball nut to vary the distance between coupling mechanism 834 and base plate 832. Extendible connector 830 may also include a flexible tube 1010 that extends between base plate 832 and coupling mechanism 834 to cover a space between gravity chamber 110 and platform 340 when linear actuator 836 is extended.

Base plate 832 includes an opening 838 that aligns with the opening 344 of platform 340. When gravity chamber 110 is attached to platform 340, berthing mechanism 826 is able to pass through opening 838 of base plate 832 and opening 344 of platform 340 to connect to berthing mechanism 334 of portal 330.

Figure 11:
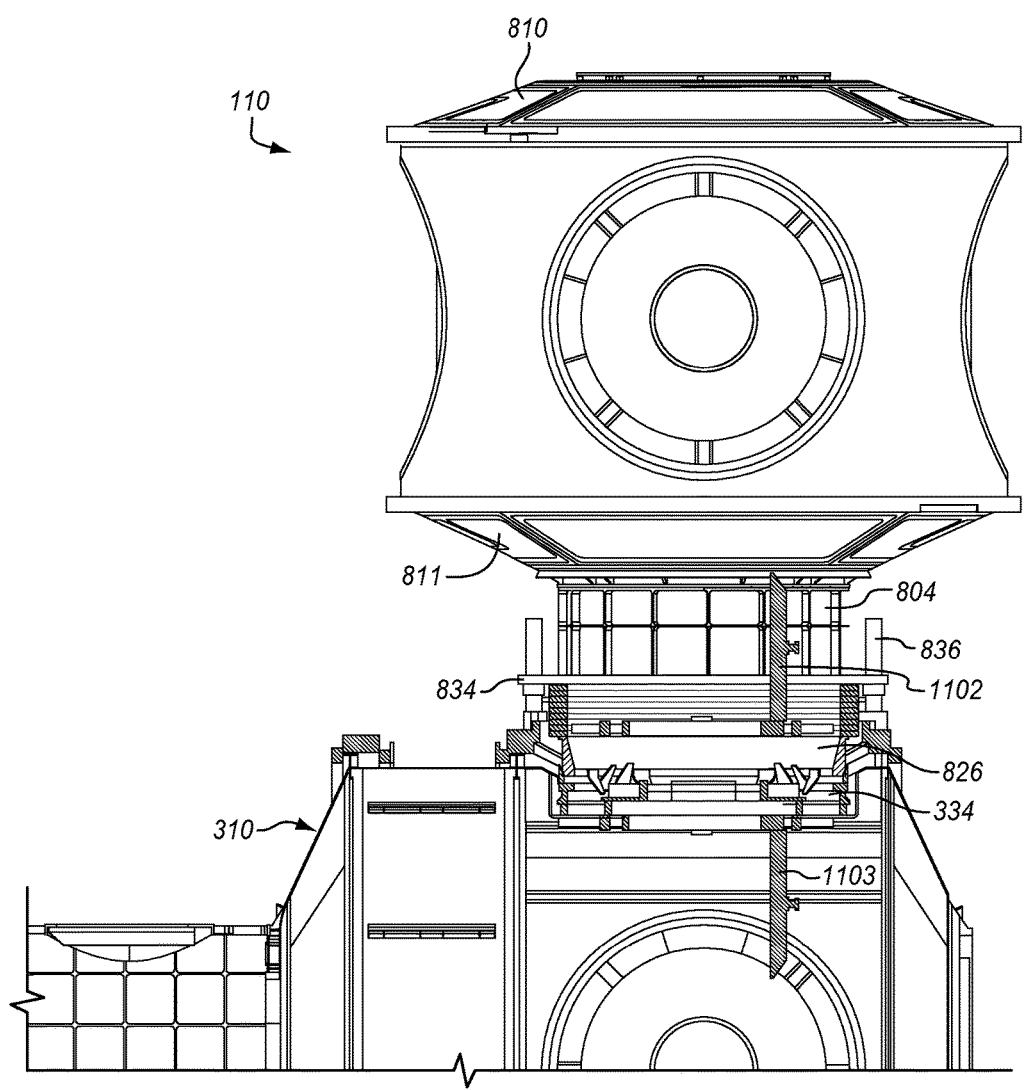
FIG. 11 illustrates a gravity chamber connected to a hub with an extendible connector in a contracted position in an exemplary embodiment.

FIG. 11 illustrates gravity chamber 110 connected to hub 310 with extendible connector 830 in a contracted position in an exemplary embodiment. In FIG. 11, linear actuators 836 of extendible connector 830 are contracted so that berthing mechanism 826 of gravity chamber 110 (see FIGS. 8-9) are able to connect with berthing mechanism 334 of portal 330 (see FIGS. 3-4). Berthing mechanisms 826 and 334 provide a pressurized seal between gravity chamber 110 and hub 310 so that crew members may pass between gravity chamber 110 and hub 310 in a pressurized environment by opening hatch 1102 in passage tube 804 and hatch 1103 in portal 330. The mating units are still sealed by the face seal between berthing mechanisms 826 and 334. When berthing mechanism 826 of gravity chamber 110 is connected to berthing mechanism 334 of portal 330, rotating structure 104 (i.e., gravity chamber 110) is not able to rotate to create an artificial gravity environment.

Figure 12:
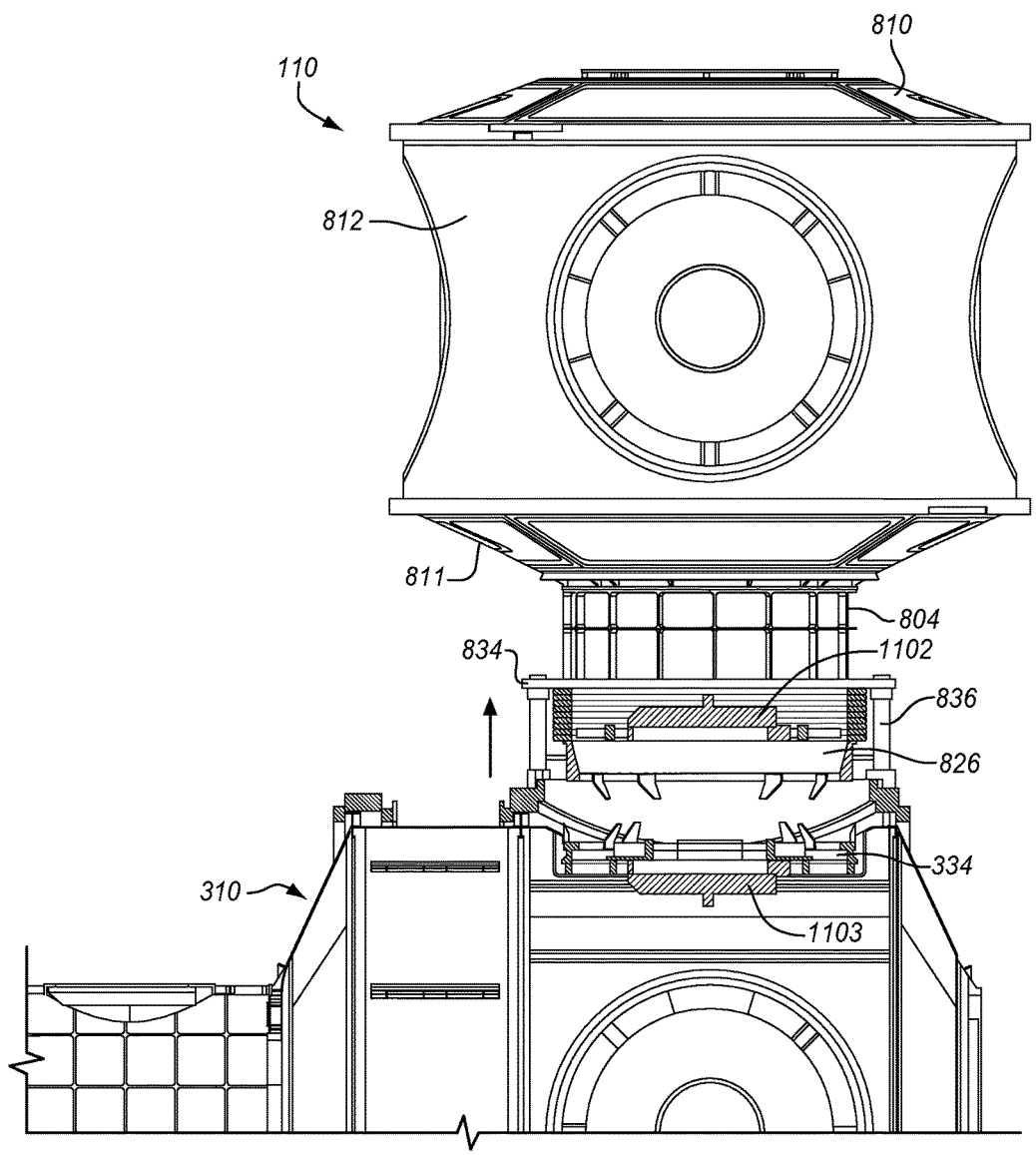
FIG. 12 illustrates a gravity chamber connected to a hub with an extendible connector in an extended position in an exemplary embodiment.
Figure 13:
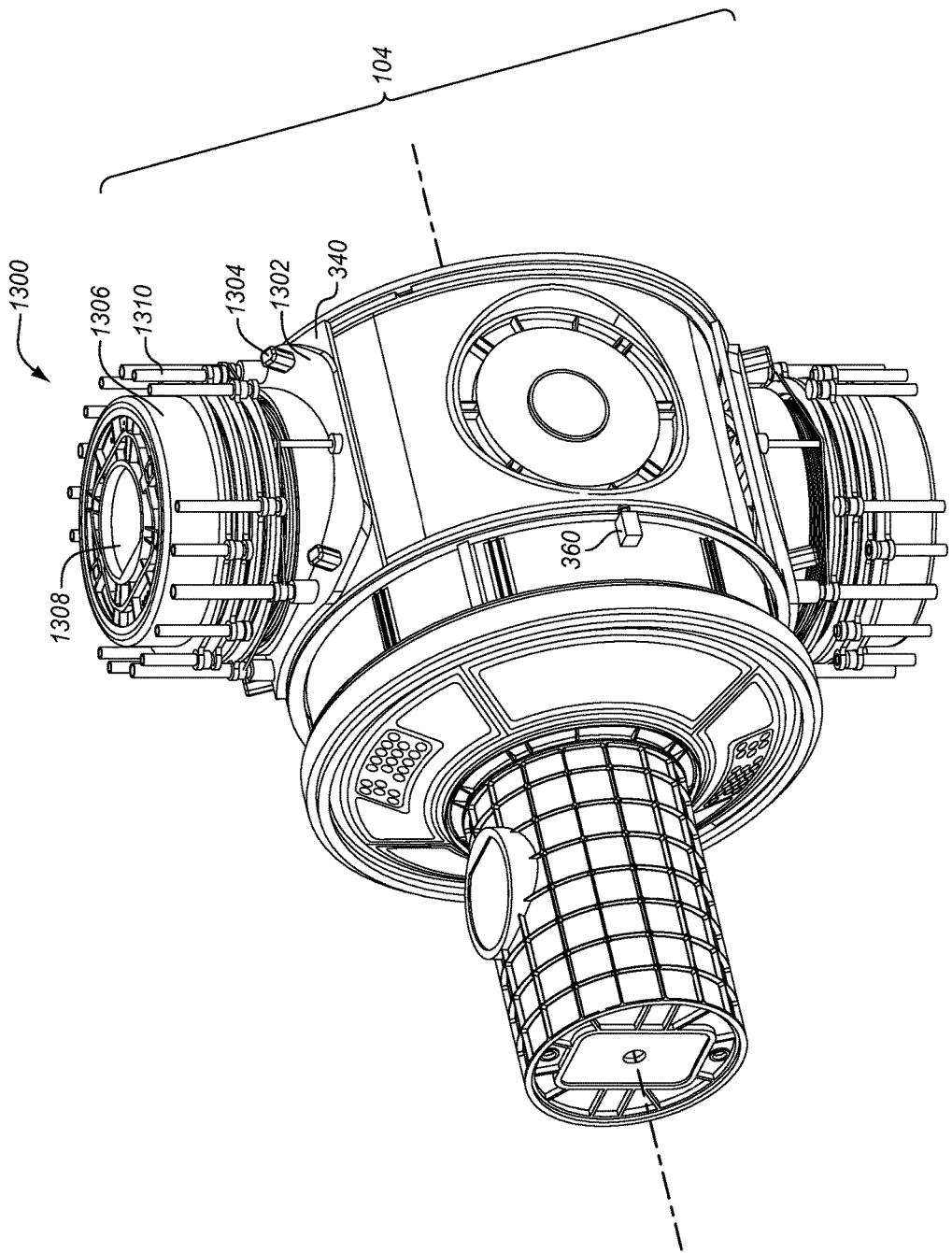
FIG. 13 illustrates a gravity chamber is a contracted position in an exemplary embodiment.
Figure 14:
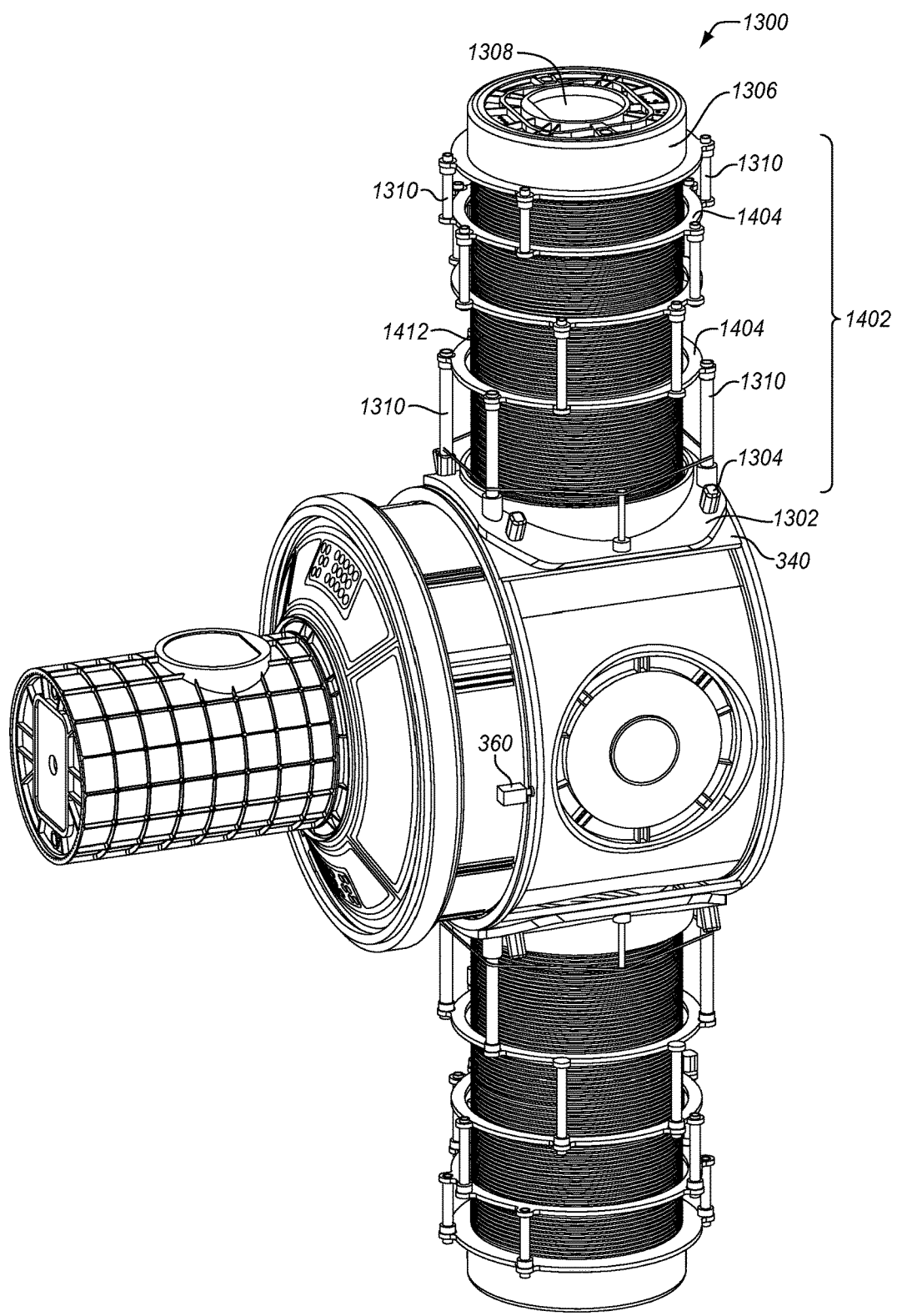
FIG. 14 illustrates a gravity chamber in an extended position in an exemplary embodiment.

To allow rotation of rotating structure 104, hatch 1102 in passage tube 804 and hatch 1103 in portal 330 are closed. Then, berthing mechanism 826 of gravity chamber 110 is disconnected from berthing mechanism 334 of portal 330. Although berthing mechanism 826 is disconnected from berthing mechanism 334, gravity chamber 110 is still attached to platform 340 by extendible connector 830. With the berthing mechanisms disconnected, extendible connector 830 can extend and raise gravity chamber 110 so there is clearance from portal 330. FIG. 12 illustrates gravity chamber 110 connected to hub 310 with extendible connector 830 in an extended position in an exemplary embodiment. In FIG. 12, linear actuators 836 of extendible connector 830 are extended to create clearance between berthing mechanism 826 of passage tube 804 (see FIGS. 8-9) and berthing mechanism 334 of portal 330 (see FIGS. 3-4). Drive mechanism 360 can then impart rotational movement to rotating structure 104 to create an artificial gravity environment in gravity chamber 110. As gravity chamber 110 rotates (see FIG. 2), the centrifugal force 202 created will pull a crew member towards outer wall 810 (i.e., floor) of gravity chamber 110. The amount of force on an object depends on the angular velocity of rotation and the distance of the object from the axis of rotation. Extendible connector 830 may vary or adjust the distance (i.e., radius) of gravity chamber 110 (i.e., outer wall 810) to axis 180 to change the amount of force. For example, extendible connector 830 may vary the radius of gravity chamber to about 6.8 meters. FIGS. 13-14 illustrate a gravity chamber in another embodiment. In this embodiment, the gravity chamber 1300 is able to extend and contract to vary a radius of the gravity chamber 1300. FIG. 13 illustrates gravity chamber 1300 in a contracted position in an exemplary embodiment. Gravity chamber 1300 includes a base plate 1302 that directly attaches to platform 340 (see FIG. 13). For example, base plate 1302 may be affixed to platform 340 using power bolts 1304. As in the above embodiments, base plate 1302 includes an opening (not visible) that aligns with the opening of platform 340. Gravity chamber 1300 also includes a cylindrical rigid module 1306 that comprises an outer wall of gravity chamber 1300. Cylindrical rigid module 1306 may include a hatch 1308, such as for emergency exits from gravity chamber 1300.

FIG. 14 illustrates gravity chamber 1300 in an extended position in an exemplary embodiment. As shown in FIG. 14, gravity chamber 1300 also includes an extendible section 1402 between base plate 1302 and cylindrical rigid module 1306 (see FIG. 14). Extendible section 1402 includes one or more linear actuators 1310. Linear actuators 1310 are configured to extend and contract to vary a distance between base plate 1302 and cylindrical rigid module 1306. Extendible section 1402 also includes a flexible tube 1412 that extends between cylindrical rigid module 1306 and base plate 1302 to cover a space between cylindrical rigid module 1306 and base plate 1302 when linear actuators 1310 are extended. Extendible section 1402 may also include one or more an annular members 1404 that fit over flexible tube 1412. Annular members 1404 connect between linear actuators 1310. If the distance in which gravity chamber 1300 extends is greater than the distance in which a linear actuator 1310 is able to extend, annular members 1404 may be used to form a step-wise extension of gravity chamber 1300.

As in the above embodiments, to allow rotation of rotating structure 104, a berthing mechanism of gravity chamber 1300 (not visible) is disconnected from a berthing mechanism of a portal. With the berthing mechanisms disconnected, gravity chamber 1300 extends and raises so there is clearance from the portal. Linear actuators 1310 of gravity chamber 1300 are extended to create clearance between the berthing mechanism of gravity chamber 1300 and a berthing mechanism of a portal. Drive mechanism 360 can then impart rotational movement to rotating structure 104 to create an artificial gravity environment in gravity chamber 1300.

The rotation of gravity chambers 110-111 may create an unwanted momentum for HAB 100. To cancel out the unwanted momentum, a counter-rotating member may be installed to rotate about axis 180 in an opposite direction than rotating structure 104. FIGS. 3-4 illustrate a counter-rotating member 370 in one embodiment. In this embodiment, counter-rotating member 370 is installed on the outer cylindrical surface of hub 310, such as with support bearings, and includes a mass that is able to be rotated around hub 310. In the embodiment shown in FIGS. 3-4, counter-rotating member 370 includes a counter-weight 372 that is an annular ring having a diameter greater than the diameter of hub 310. Counter-weight 372 does not have to be a continuous structure as shown in FIGS. 3-4, but may be segmented and spaced around the circumference of hub 310. Counter-weight 372 is driven by a drive mechanism 402 (see FIG. 4) to rotate in the opposite direction of rotating structure 104 about axis 180 to negate momentum created by rotation of gravity chambers 110-111. Momentum is measured in mass multiplied by velocity (rotational). If it is assumed that the mass of counter-weight 372 is fixed, then counter-weight 372 is driven at a speed to compensate for the momentum created by rotation of rotating structure 104. If the mass of rotating structure 104 changes (e.g., crew members enter one of gravity chambers 110-111), then drive mechanism 402 adjusts the rotational speed of counter-weight 372 to compensate for the change in mass. The rotational speed of counter-weight 372 is therefore adjusted so that there is a net-zero momentum change due to rotation of rotating structure 104.

Although specific embodiments were described herein, the scope is not limited to those specific embodiments. Rather, the scope is defined by the following claims and any equivalents thereof.

The invention claimed is:
1. A habitation module comprising:
  a stationary structure including a hub that comprises a hollow cylinder having a plurality of portals spaced radially around an outer cylindrical surface of the hub;
  a rotating structure that attaches to the outer cylindrical surface of the hub using rotatable attachment members to rotate about an axis in relation to the hub, the rotating structure comprising:
    at least one platform that attaches to the rotatable attachment members and is configured to revolve around the outer cylindrical surface of the hub on the rotatable attachment members, wherein the at least one platform includes a first opening that aligns with a portal of the hub; and
    at least one gravity chamber that attaches to the at least one platform over the first opening, and projects radially from the axis; and
  a first drive mechanism configured to rotate the rotating structure about the axis in relation to the hub to simulate a gravitational force within the at least one gravity chamber.
2. The habitation module of claim 1 wherein the rotating structure further includes:
  an extendible connector configured to attach the at least one gravity chamber to the at least one platform;
  wherein the portals each include a first berthing mechanism;
  wherein the at least one gravity chamber includes a second berthing mechanism; and
  wherein the extendible connector is configured to contract to allow the second berthing mechanism to connect with the first berthing mechanism to form pressure tight seal, and to extend to provide clearance between the second berthing mechanism and the first berthing mechanism when disconnected for rotation of the rotating structure about the axis.
3. The habitation module of claim 2 wherein:
the berthing mechanisms comprise Common Berthing Mechanisms (CBM).
4. The habitation module of claim 2 wherein:
the extendible connector includes:
  a base plate configured to directly attach to the at least one platform, and includes a second opening that aligns with the first opening of the at least one platform;
  a coupling mechanism that directly attaches to the at least one gravity chamber; and
  at least one linear actuator that connects between the base plate and the coupling mechanism, and is configured to extend and contract to vary a distance between the base plate and the coupling mechanism.
5. The habitation module of claim 4 wherein:
the at least one linear actuator comprises a ball screw.
6. The habitation module of claim 4 wherein:
the at least one gravity chamber comprises:
  a hollow cylindrical enclosure that includes an outer wall, an inner wall, and a cylindrical side wall that connects the outer wall and the inner wall; and a passage tube that projects from the inner wall of the hollow cylindrical enclosure;
wherein a diameter of the hollow cylindrical enclosure is greater than a diameter of the passage tube.

7. The habitation module of claim 6 wherein:
the coupling mechanism comprises an annular member that fits over the passage tube of the at least one gravity chamber, and attaches directly to the passage tube; and
the extendible connector includes a flexible tube that extends between the base plate and the annular member to cover a space between the at least one gravity chamber and the at least one platform when the at least one linear actuator is extended.

8. The habitation module of claim 6 wherein:
the passage tube includes a first hatch;
the portals each include a second hatch; and
the first hatch and the second hatch are configured to be sealed when the first berthing mechanism and the second berthing mechanism are disconnected, and when the at least one linear actuator extends to provide clearance between the first berthing mechanism and the second berthing mechanism to allow the rotating structure to rotate about the axis.

9. The habitation module of claim 1 wherein:
the rotatable attachment members include a pair of annular support bearings that attach to the outer cylindrical surface of the hub, and are spaced apart from one another on opposing sides of the portals.

10. The habitation module of claim 9 wherein:
the at least one platform comprises a curved sheet of material that spans a gap between the pair of annular support bearings.

11. The habitation module of claim 1 further comprising:
a counter-rotating member that rotates about the axis in an opposite direction than the rotating structure.

12. The habitation module of claim 11 wherein the counter-rotating member comprises:
a cylindrical counter-weight; and
a second drive mechanism that rotates the cylindrical counter-weight about the axis in the opposite direction than the rotating structure.

13. The habitation module of claim 12 wherein:
the second drive mechanism adjusts a rotational speed of the cylindrical counter-weight to compensate for a change in mass within the at least one gravity chamber.

14. The habitation module of claim 1 wherein the at least one gravity chamber includes:
a base plate configured to directly attach to the at least one platform;
a cylindrical rigid module that comprises an outer wall of the gravity chamber;
at least one linear actuator that connects between the base plate and the cylindrical rigid module, and is configured to extend and contract to vary a distance between the base plate and the cylindrical rigid module; and
a flexible tube that extends between the cylindrical rigid module and the base plate to cover a space between the cylindrical rigid module and the base plate when the at least one linear actuator is extended.

15. An apparatus comprising:
a habitation module for providing an artificial gravity environment in space, the habitation module comprising:
a stationary structure including a hub that comprises a hollow cylinder having a plurality of portals spaced radially around an outer cylindrical surface of the hub;
a rotating structure that attaches to the outer cylindrical surface of the hub using annular support bearings to rotate about an axis in relation to the hub, the rotating structure comprising:
an opposing pair of platforms that attach to the annular support bearings and are configured to revolve around the outer cylindrical surface of the hub on the annular support bearings, wherein the platforms each include a first opening that aligns with a portal of the hub; and
an opposing pair of gravity chambers that attach to the platforms over the first opening, and project radially from the axis in opposite directions; and
a drive mechanism configured to rotate the rotating structure about the axis in relation to the hub to simulate a gravitational force within the gravity chambers.

16. The apparatus of claim 15 wherein the rotating structure further includes:
extendible connectors configured to attach the gravity chambers to the platforms;
wherein the portals each include a first berthing mechanism;
wherein the gravity chambers each include a second berthing mechanism; and
wherein the extendible connectors are each configured to contract to allow the second berthing mechanism to connect with the first berthing mechanism to form pressure tight seal, and to extend to provide clearance between the second berthing mechanism and the first berthing mechanism when disconnected for rotation of the rotating structure about the axis.

17. The apparatus of claim 16 wherein:
the berthing mechanisms comprise Common Berthing Mechanisms (CBM).

18. The apparatus of claim 16 wherein:
each extendible connector includes:
a base plate configured to directly attach to one of the platforms, and includes a second opening that aligns with the first opening of the one of the platforms;
a coupling mechanism that directly attaches to one of the gravity chambers; and
at least one linear actuator that connects between the base plate and the coupling mechanism, and is configured to extend and contract to vary a distance between the base plate and the coupling mechanism.

19. The apparatus of claim 18 wherein:
the one of the gravity chambers comprises:
a hollow cylindrical enclosure that includes an outer wall, an inner wall, and a cylindrical side wall that connects the outer wall and the inner wall; and
a passage tube that projects from the inner wall of the hollow cylindrical enclosure;
wherein a diameter of the hollow cylindrical enclosure is greater than a diameter of the passage tube.

20. The apparatus of claim 19 wherein:
the coupling mechanism comprises an annular member that fits over the passage tube, and attaches directly to the passage tube; and
each of the extendible connectors includes a flexible tube that extends between the base plate and the annular member to cover a space between the one of the gravity chambers and the one of the platforms when the at least one linear actuator is extended.

21. The apparatus of claim 19 wherein:
the passage tube includes a first hatch;
the portals each include a second hatch; and the first hatch and the second hatch are configured to be sealed when the first berthing mechanism and the second berthing mechanism are disconnected, and when the at least one linear actuator extends to provide clearance between the first berthing mechanism and the second berthing mechanism to allow the rotating structure to rotate about the axis.

22. The apparatus of claim 15 wherein:
the platforms each comprise a curved sheet of material that spans a gap between the annular support bearings.

23. The apparatus of claim 15 further comprising:
a counter-rotating member that rotates about the axis in an opposite direction than the rotating structure.

24. An apparatus comprising:
a habitation module for providing an artificial gravity environment in space, the habitation module comprising:
  a stationary structure including a hub that comprises a hollow cylinder having a plurality of portals spaced radially around an outer cylindrical surface of the hub, wherein each of the portals includes a first berthing mechanism;
  a rotating structure that attaches to the outer cylindrical surface of the hub using annular support bearings to rotate about an axis in relation to the hub, the rotating structure comprising:
    an opposing pair of platforms that attach to the annular support bearings and are configured to revolve around the outer cylindrical surface of the hub on the annular support bearings, wherein the platforms each include a first opening that aligns with a portal of the hub; and
    an opposing pair of gravity chambers that attach to the platforms over the first opening, and project radially from the axis in opposite directions, wherein each of the gravity chambers include a second berthing mechanism; and
    extendible connectors configured to attach the gravity chambers to the platforms, wherein each of the extendible connectors are configured to contract to allow the second berthing mechanism to connect with the first berthing mechanism to form pressure tight seal, and to extend to provide clearance between the second berthing mechanism and the first berthing mechanism when disconnected for rotation of the rotating structure about the axis; and
  a drive mechanism configured to rotate the rotating structure about the axis in relation to the hub to simulate a gravitational force within the gravity chambers.

25. The apparatus of claim 24 wherein:
each of the extendible connectors includes:
  a base plate configured to directly attach to one of the platforms, and includes a second opening that aligns with the first opening of the one of the platforms;
  a coupling mechanism that directly attaches to one of the gravity chambers; and
  at least one linear actuator that connects between the base plate and the coupling mechanism, and is configured to extend and contract to vary a distance between the base plate and the coupling mechanism.

26. The apparatus of claim 25 wherein:
the one of the gravity chambers comprises:
  a hollow cylindrical enclosure that includes an outer wall, an inner wall, and a cylindrical side wall that connects the outer wall and the inner wall; and
  a passage tube that projects from the inner wall of the hollow cylindrical enclosure, and includes the second berthing mechanism;
  wherein a diameter of the hollow cylindrical enclosure is greater than a diameter of the passage tube.

27. The apparatus of claim 26 wherein:
the coupling mechanism comprises an annular member that fits over the passage tube, and attaches directly to the passage tube; and
each of the extendible connectors includes a flexible tube that extends between the base plate and the annular member to cover a space between the one of the gravity chambers and the one of the platforms when the at least one linear actuator is extended.

28. The apparatus of claim 26 wherein:
the passage tube includes a first hatch;
the portals each include a second hatch; and
the first hatch and the second hatch are configured to be sealed when the first berthing mechanism and the second berthing mechanism are disconnected, and when the at least one linear actuator extends to provide clearance between the first berthing mechanism and the second berthing mechanism to allow the rotating structure to rotate about the axis.

29. The apparatus of claim 24 wherein:
the berthing mechanisms comprise Common Berthing Mechanisms (CBM).

30. The apparatus of claim 24 wherein:
the platforms each comprise a curved sheet of material that spans a gap between the annular support bearings.

31. The apparatus of claim 24 wherein the habitation module further comprises:
a counter-rotating member that rotates about the axis in an opposite direction than the rotating structure.

* * * * *